US010178099B2

(12) United States Patent
Hasegawa et al.

(10) Patent No.: US 10,178,099 B2
(45) Date of Patent: Jan. 8, 2019

(54) SYSTEM FOR MONITORING ACCESS TO NETWORK WITHIN SECURED SITE

(71) Applicant: International Business Machines Corporation, Armonk, NY (US)

(72) Inventors: Tohru Hasegawa, Tokyo (JP); Toshiyasu Motoki, Kanagawa prefecture (JP); Yutaka Oishi, Kanagawa (JP); Masao Takayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 14/832,011

(22) Filed: Aug. 21, 2015

(65) Prior Publication Data
US 2016/0080391 A1 Mar. 17, 2016

(30) Foreign Application Priority Data

Sep. 12, 2014 (JP) .................................. 2014-185938

(51) Int. Cl.
*H04L 29/06* (2006.01)
*H04W 4/80* (2018.01)
*H04W 12/08* (2009.01)

(52) U.S. Cl.
CPC ............. *H04L 63/102* (2013.01); *H04W 4/80* (2018.02); *H04W 12/08* (2013.01)

(58) Field of Classification Search
CPC ..... H04L 63/102; H04L 67/306; H04L 63/20; H04W 12/084; H04W 4/80; H04W 12/08
(Continued)

(56) References Cited

U.S. PATENT DOCUMENTS 5,499,017 A * 3/1996 Beigel ................ G06K 19/0723
340/10.32
5,832,090 A * 11/1998 Raspotnik ............ G06Q 20/341
235/380
(Continued)

FOREIGN PATENT DOCUMENTS

JP 2004318663 A 11/2004
JP 2006099306 A 4/2006
(Continued)

OTHER PUBLICATIONS

Http://www.nxp.com, ( UM10204, "I2C—bus specification and user manual"), Rev. 6-4 Apr. 2014, pp. 1-64.*

*Primary Examiner* — Kambiz Zand
*Assistant Examiner* — Tongoc Tran
(74) *Attorney, Agent, or Firm* — Daniel Simek; Hoffman Warnick LLC

(57) ABSTRACT

A controller is provided which monitors/manages information terminals' access to a network within a secured site. A controller of the present invention includes: a storage device for storing security information about at least one or more information terminals received from the information terminals before accessing a network; and a processor for determining whether to permit access of an information terminal to the network based on the security information read from the storage device and access permission criteria on the security information, and generating a control signal for permitting or blocking the access of the information terminal to the network according to the determination result.

12 Claims, 3 Drawing Sheets

(58) Field of Classification Search
USPC .......................................................... 726/4
See application file for complete search history.

(56) References Cited

U.S. PATENT DOCUMENTS

| | | | | |
|---|---|---|---|---|
| 6,650,227 | B1* | 11/2003 | Bradin | G06K 7/0008 340/10.1 |
| 7,009,517 | B2* | 3/2006 | Wood | G06K 19/0717 340/539.26 |
| 7,108,177 | B2* | 9/2006 | Brookner | G06F 21/35 235/380 |
| 8,307,091 | B1* | 11/2012 | Croak | G06Q 30/01 340/5.85 |
| 2005/0236479 | A1* | 10/2005 | Schmidtberg | G01D 9/005 235/384 |
| 2007/0034691 | A1* | 2/2007 | Davis | G06Q 20/3278 235/382 |
| 2007/0046467 | A1* | 3/2007 | Chakraborty | G06K 7/0008 340/572.1 |
| 2007/0282988 | A1* | 12/2007 | Bornhoevd | G06Q 10/00 709/223 |
| 2009/0243803 | A1* | 10/2009 | Ono | G06K 17/00 340/10.1 |
| 2010/0027521 | A1* | 2/2010 | Huber | G06Q 20/1235 370/338 |
| 2010/0073202 | A1* | 3/2010 | Mazed | G06F 1/1613 340/999 |
| 2011/0163852 | A1* | 7/2011 | Kanda | G06K 7/10297 340/10.1 |
| 2011/0314094 | A1 | 12/2011 | De Oliveira Antunes | |
| 2012/0079045 | A1* | 3/2012 | Plotkin | H04L 12/585 709/206 |
| 2013/0176115 | A1* | 7/2013 | Puleston | H04L 67/04 340/10.51 |
| 2013/0222595 | A1* | 8/2013 | Gebauer | H04N 5/217 348/148 |
| 2013/0303085 | A1* | 11/2013 | Boucher | H04W 4/008 455/41.1 |
| 2014/0247118 | A1* | 9/2014 | Kovacic | G06K 19/0717 340/10.51 |

FOREIGN PATENT DOCUMENTS

| | | |
|---|---|---|
| JP | 2006514348 A | 4/2006 |
| JP | 2007232361 A | 9/2007 |
| JP | 2008270902 A | 11/2008 |
| JP | 2008299457 A | 12/2008 |
| JP | 2011039957 A | 2/2011 |
| JP | 2011130016 A | 6/2011 |
| JP | 2011150709 A | 8/2011 |
| JP | 2012519322 A | 8/2012 |
| JP | 2013168118 A | 8/2013 |

* cited by examiner

SYSTEM FOR MONITORING ACCESS TO NETWORK WITHIN SECURED SITE

TECHNICAL FIELD

The present invention relates to monitoring of access to a network within a secured site, and more specifically to a controller, system, and method for monitoring/managing the access by an information terminal to a network within a secured site.

BACKGROUND ART

In order to protect confidential information or personal information in information terminals such as personal computers (hereinafter called PCs) connectable to a network, it is important to grasp/manage security information including the versions and management levels of an OS and applications applied to each of the information terminals, and the like. The importance is particularly high in a network within a secured site.

Under the conventional technology, an information terminal having confidential information or personal information uses a firewall to prevent unauthorized access from outside or individually applies a patch delivered to an OS to provide protection.

However, when one person manages two or more information terminals or when two or more users share one information terminal, it is difficult to keep the versions and management levels of the OS and applications on each of the information terminals always up-to-date. In other words, since the management of the information terminals and the management of versions are often left to each individual administrator, the vulnerability may not be actually fixed even if the administrator believes them to be up-to-date, or the antivirus level may be low. Thus, there is a limit to what each individual administrator can do to maintain and manage the security level of each information terminal.

Japanese Patent No. 5323873 and Japanese Patent Application Publication No. 2006-99306 are hereby incorporated by reference.

SUMMARY OF INVENTION

The present invention provides a controller, system, and method for monitoring/managing the access of an information terminal to a network, especially to a network within a secured site in order to solve or reduce the above problem of the conventional technology.

In one aspect of the present invention, there is provided a controller for monitoring the access of an information terminal to a network within a secured site. The controller includes: (a) a storage device for storing security information on at least one or more information terminals received from the information terminals before accessing the network; and (b) a processor for determining whether to permit the access of the information terminal to the network from the security information read from the storage device and access permission criteria on the security information, and generating a control signal for permitting or blocking the access of the information terminal to the network according to the determination result.

According to the one aspect of the present invention, before the access of an information terminal to the network within the secured site, it is automatically determined whether to permit the access from the security state of the information terminal, and in the event of a problem with the information terminal, the access can be blocked.

In the one aspect of the present invention, the controller may receive, through an RFID reader, the security information stored in an RFID tag included in the information terminal.

According to the one aspect of the present invention, even when the information terminal is not started, it can be automatically determined whether an information terminal is the information terminal having a problem with the security state at the stage of entering the secured site.

In another aspect of the present invention, there is provided a management system for managing the access of an information terminal to a network within a secured site. The management system includes: (a) a receiver for receiving security information on at least one or more information terminals from the information terminals before accessing the network; (b) a controller for determining whether to permit the access of the information terminal to the network from the security information received from the receiver and the latest access permission criteria on the security information, and generating a control signal for permitting or blocking the access of the information terminal to the network according to the determination result; and (c) a filter device for permitting or blocking the access of the information terminal to the network according to the control signal from the controller.

According to the other aspect of the present invention, before the access of an information terminal to the network within the secured site, it is automatically determined whether to permit the access from the security state of the information terminal, and in the event of a problem with the security state of the information terminal, the access can be blocked.

In still another aspect of the present invention, there is provided a method of using a controller to monitor the access of an information terminal to a network within a secured site. The method includes the steps of: (a) receiving security information on at least one or more information terminals from the information terminals before accessing the network; (b) determining whether to permit the access of the information terminal to the network from the received security information and the latest access permission criteria on the security information; (c) generating a control signal for permitting or blocking the access of the information terminal to the network according to the determination result; and (d) permitting or blocking the access of the information terminal to the network according to the control signal.

According to the still other aspect of the present invention, before the access of an information terminal to the network within the secured site, it is automatically determined whether to permit the access from the security state of the information terminal, and in the event of a problem with the security state of the information terminal, the access can be blocked.

DETAILED DESCRIPTION

Figure 1:
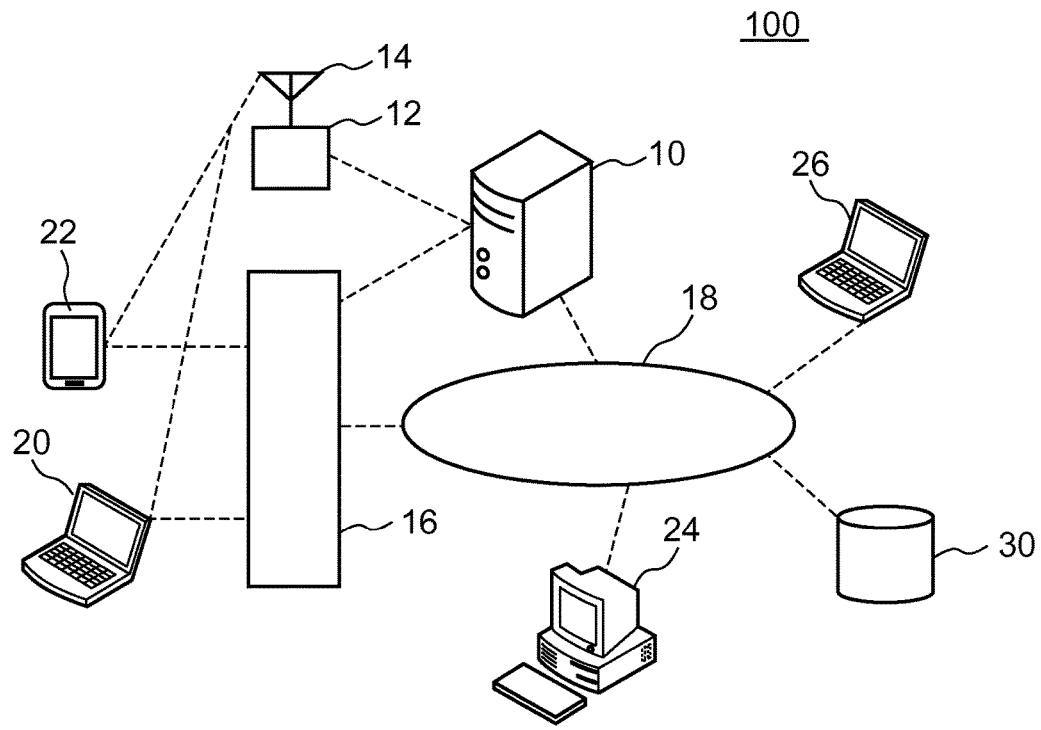
FIG. 1 is a diagram showing a configuration example of a management system of the present invention.

An embodiment of the present invention will be described with reference to the accompanying drawings. FIG. 1 shows a configuration example of a management system of the present invention. A management system 100 in FIG. 1 shows a configuration example when it is connected to a network 18 in a secured site in a communicable manner. Here, the secured site means an area whose security management is important, such as a highly-confidential department of a company. The secured site is not physically limited to an area within one building, and two or more separate places connected through the network 18 in a communicable manner can be included. The broken lines in FIG. 1 indicate wireless or wired communication paths.

The management system 100 includes a controller 10, an RFID reader 12, and a filter device 16 as a basic configuration. Reference numerals 20, 22, 24, and 26 represent information terminals. For example, the information terminals include a laptop PC, a tablet PC, a smartphone, and the like. The information terminals 20 and 22 are information terminals that are going to be connected to (access) the network 18. The information terminals 24 and 26 are information terminals already connected to the network 18. Reference numeral 30 represents a storage device connected to the network 18. As the storage device 30, for example, an HDD, a tape storage device, an optical/magnetooptical disk drive, or the like is included.

The controller 10 can be a so-called computer. For example, a PC, a server, or the like can be included. The controller 10 implements a method (function) of the present invention under the execution of a predetermined program (software). The RFID reader 12 transmits electromagnetic waves through an antenna 14 to drive RFID tags (hereinafter also called devices) attached to the information terminals 20 and 22, and receives predetermined information from the RFID devices. The RFID reader 12 transmits the received information to the controller 10. The RFID reader 12 can also be incorporated in or attached to the controller 10 as part of the controller 10. The RFID reader 12 is shown as an example of a non-contact (wireless) information storage and reader, and any other non-contact (wireless) information storage and reader having similar functionality can also be used.

The filter device 16 is a device for permitting (passing) or blocking the access of an information terminal to the network 18, which corresponds to a device having a so-called firewall (filter) function. The information terminals can access the network 18 only through the filter device 16. The filter device 16 can also be incorporated in or attached to the controller 10 as part of the controller 10.

Figure 2:
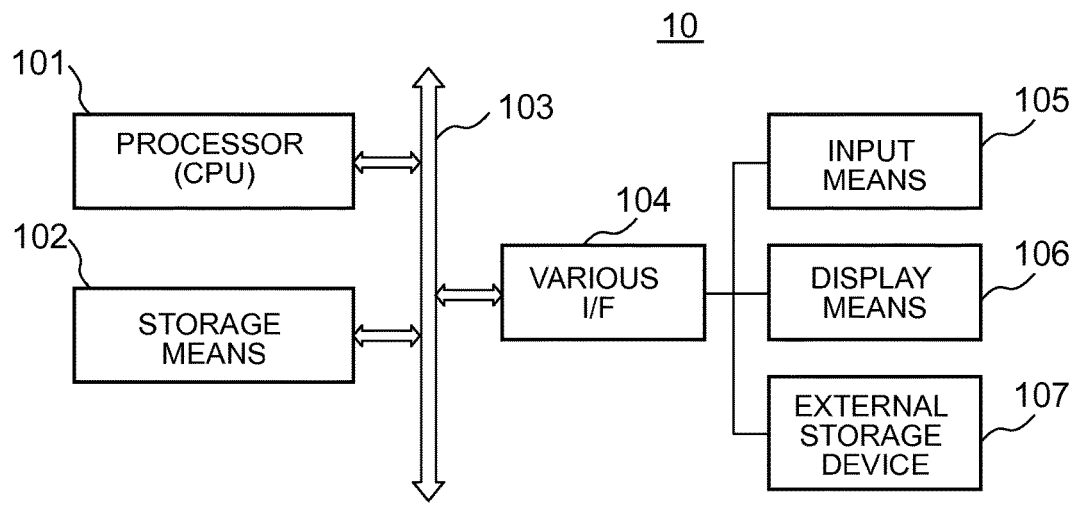
FIG. 2 is a diagram showing a configuration example of a controller of the present invention.

FIG. 2 is a block diagram showing a configuration example of the controller 10 in FIG. 1. The controller 10 includes a processor (CPU) 101, a storage device 102, and various I/F 104 connected one another through a bus 103. The various I/F 104 is used as a generic term that includes an input I/F, an output I/F, an external storage I/F, an external communication I/F, and the like. Each I/F is connected to corresponding means, namely I/O means 105 such as a keyboard, a mouse, or a communication adapter, display means 106 such as a CRT or an LCD, or an external storage device 107 such as a semiconductor memory through a USB connection or an HDD. The storage device 102 can include semiconductor memories such as a RAM and a ROM, and an HDD. The function (method) of the present invention is implemented in such a manner that the controller 10 calls and executes predetermined software stored, for example, in the storage device 102, 107.

Figure 3:
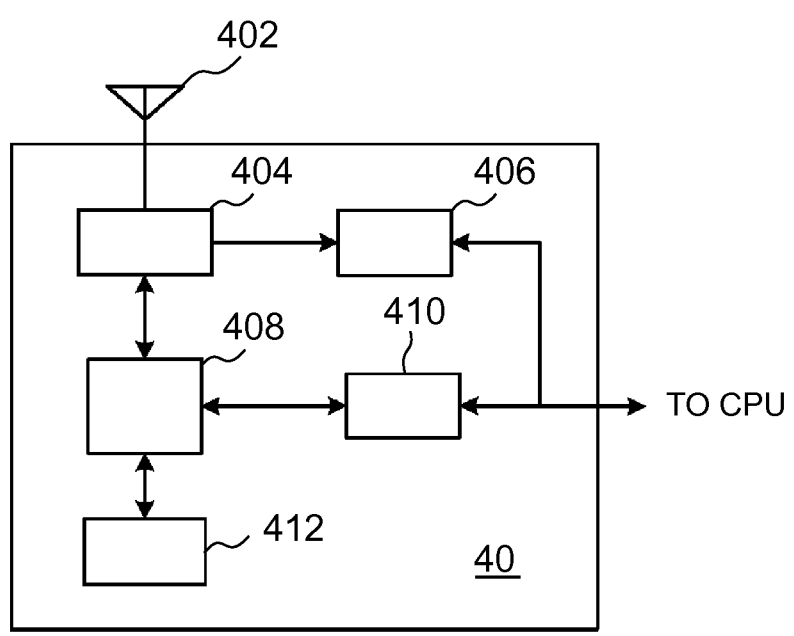
FIG. 3 is a diagram showing a configuration example of an RFID of the present invention.

FIG. 3 is a block diagram showing a configuration example of a RFID device 40 attached to the information terminal 20 or the like. The RFID device 40 can be placed in the information terminal or on a lateral wall of the information terminal. An antenna 402 receives electromagnetic waves as drive power from the RFID reader 12 in FIG. 1, and an analog logic circuit 404 converts the electromagnetic waves to induced electromotive current and sends the electromotive current to a battery 406. The battery 406 stores input current and supplies drive power of an RFID tag (device) 40. Thus, necessary information can be obtained from the RFID tag (device) 40 even if the information terminal is powered off. The battery 406 can also receive power (current) from a battery or the like in the information terminal. This enables the transmission of information to the controller 10 located in a relatively distance position even when the electromagnetic waves from the RFID reader 12 are weak.

A controller 408 is connected to the CPU, the memory, and the like in the information terminal through an interface 410 in a communicable manner. The interface 410 can be, for example, an $I^2C$ interface. The controller 408 receives, through the interface 410, security information on the types (IDs) and versions of software such as an OS, applications, and antivirus software that run on the information terminal. The controller 408 stores the received security information in a memory 412. The memory 412 includes, for example, a nonvolatile memory like a flash memory. The information terminal is configured to send, to the RFID device 40, the security information on the IDs and versions using a dedicated driver at the time of introduction of software or at the update time.

Figure 4:
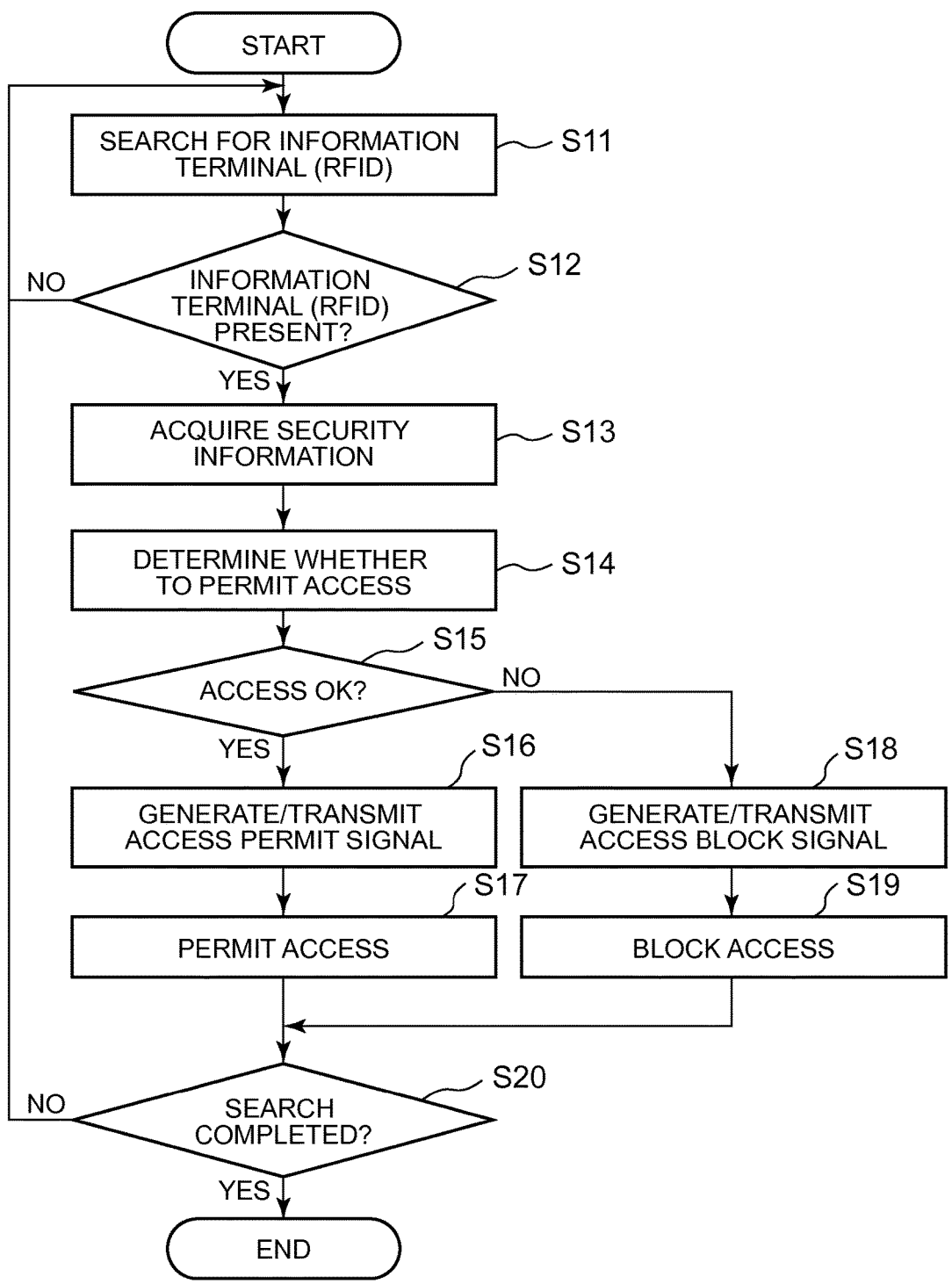
FIG. 4 is a chart showing a flow of a method of the present invention.

Next, a flow of a method of the present invention will be described with reference to the accompanying drawings. FIG. 4 is a chart showing a flow of a method of one embodiment of the present invention. The flow of FIG. 4 shows a basic flow of the method. Based on the system configuration in FIG. 1, the flow of FIG. 4 will be described below. The flow of FIG. 4 is executed by (under the control of) the controller 10 as already described.

In step S11, the controller 10 searches whether the information terminal 20, 22 has come into a secured site. Specifically, the controller 10 sends a signal for searching the presence or absence of the RFID device 40 of the information terminal 20, 22 through the RFID reader 12. In step S12, the presence or absence of the information terminal (RFID) is determined. Specifically, the determination is made as to the presence or absence of a response (Ack including ID information) to the search signal previously sent. When this determination is No, the procedure returns to step S12 to continue to search for an information terminal. Since access from any information terminal with no RFID device 40 attached is never permitted, access can be limited only to information terminals with the RFID device 40 attached, i.e., with which the presence or absence of the RFID device 40 is registered beforehand. This can completely prevent access to the network from an unregistered information terminal.

When the determination in step S12 is Yes, security information is acquired from the found information terminal 20, 22 in the next step S13. Specifically, the security information on the types (IDs) and versions of software such as the OS, the applications, and the antivirus software stored in the memory 412 inside the information terminal already described with reference to FIG. 3 is received. The security information is received through the RFID reader 12 in FIG. 1. The received security information is stored in the storage device 102, 107 of the controller 10.

In step S14, it is determined whether to permit the access of the found information terminal 20, 22 to the network 18. Specifically, for example, the determination is made as follows. Note that information on the latest version of software and the like as access permission criteria are updated by the controller 10 periodically so that the latest information will be stored in the storage device 102, 107.

(i) A determination is made as to whether the types (IDs) of software such as the OS, the applications, the antivirus software match with those of registered software to be permitted to access. This can prevent access (unauthorized access) under the execution of risky software on the information terminal.

(ii) A determination is made as to whether the versions of software including the OS are the latest versions or problem-free version levels or higher. This can permit access only with the latest versions of antivirus software and the like.

(iii) Since the above determinations (i) and (ii) are made for each software, a determination as to whether to permit access can be made in units of software executed on the information terminal. In other words, for example, such a determination that OSI is OK only when it is the latest version, application A is OK if it is of version 3 or higher, and application C is NG regardless of the version can be made.

When access from the information terminal can be permitted, an access permit signal is generated and transmitted in step S16. Specifically, a filter signal for access permission is transmitted to the filter device 16 in FIG. 1 together with the ID (e.g., IP address) of the information terminal. At this time, the access permit signal can be generated and transmitted in units of software that runs on the information terminal as mentioned above. In this case, the ID of corresponding software is also transmitted to the filter device 16 at the same time together with the ID of the information terminal. In step S17, the filter device 16 permits access from the information terminal/software having the IDs received (i.e., it clears the filter). This enables the information terminal to access the network 18 after startup.

When access from the information terminal cannot be permitted, an access block signal is generated and transmitted in step S18 to block the access in step S19. Specifically, a filter signal for blocking access is transmitted to the filter device 16 in FIG. 1 together with the ID of the information terminal. At this time, the access block signal can be generated and transmitted in units of software that runs on the information terminal like in the case of access permission. In this case, the ID of corresponding software is also transmitted to the filter device 16 at the same time together with the ID of the information terminal. In step S19, the filter device 16 blocks access from the information terminal/software having the IDs received. This disables the information terminal to access the network 18 after startup.

When the filter device 16 is blocking all the access paths by default, a flow of steps S18 and S19 can be omitted. In this case, access from any information terminal with no RFID device 40 attached is never permitted. Further, the controller 10 can transmit the determination result of blocking the access to the information terminal the access of which is not permitted to make the reason known and urge updating of the version of corresponding software and the like.

In step S20, it is determined whether to complete the search in step S11. When the search is not to be completed, the procedure returns to step S11 to continue the search. When the search is to be completed due to temporary or periodic closing of the secured site, the flow of the method is ended.

The present invention described with reference to the aforementioned embodiment can have the following working effects:

(a) An information terminal using old versions of OS, applications, antivirus software, or the like, the use of which a user is not aware, can be automatically grasped before being connected to a network to reduce the danger of facing a threat from outside immediately after the connection.

(b) An information terminal can be prevented from using a vulnerable application and hence leaking information carelessly.

(c) Since version information on an OS and applications on each information terminal can be managed by the controller in an integrated fashion, an administrator of each individual information terminal does not need to care about whether the versions of the OS and applications are latest, and this can avoid the risk of information leakage from vulnerable parts of the old versions of the OS and applications.

(d) If an administrator of an information terminal rejected by the controller to pass through the filter device recognizes that the latest version of an application is not introduced, the latest version can be introduced into the information terminal separately. Since the introduction is reported to the controller through the RFID, a filter is generated in the filter device when the version of the application becomes the latest to enable the information terminal to pass through the filter device.

(e) Since the filter can be generated before the information terminal is started or before the network is configured, if the information terminal has the latest versions of software such as the OS, the environment to pass through the filter device will be already created at the stage of entering the secured site and being connected to the network.

The embodiment of the present invention has been described with reference to the accompanying drawings. However, the present invention is not limited to the embodiment. It should be noted that the present invention can be carried out in other forms to which various improvements, modifications, and variations are added based on the knowledge of those skilled in the art without departing from the spirit of the present invention.

The invention claimed is:

1. A system for managing access of an information terminal to a network within a secured site, comprising:
   an RFID tag coupled to the information terminal, the RFID tag including a storage device for storing security information received from the information terminal, wherein the security information includes information on a type and a version of software in a set of software on the information terminal; and
   a controller including:
      an RFID reader for receiving the security information regarding the information terminal from the RFID tag;
      a storage device storing access permission criteria, the access permission criteria including a required type and a required version of the software in the set of software; and a processor for determining whether to permit access of the information terminal to the network based on the security information received by the RFID reader from the storage device of the RFID tag and the access permission criteria stored in the storage device of the controller, and for generating a control signal for permitting the access of the information terminal to the network only when the type and the version of each software in the set of software on the information terminal matches the required type and the required version of each software in the set of software included in the access permission criteria stored in the storage device of the controller.

2. The controller according to claim 1, wherein when the software in the set of software stored in the storage device of the information terminal is not of a predetermined version or higher, the processor generates a control signal for blocking access of the information terminal to the network.

3. The controller according to claim 2, wherein the predetermined version is a latest version, and wherein the processor receives and stores information regarding the latest version in the storage device of the controller.

4. The controller according to claim 1, wherein the processor generates a filter signal for a firewall of the network as the control signal.

5. A management system for managing access of an information terminal to a network within a secured site, comprising:

an information terminal including an RFID tag, the RFID tag including a storage device for storing security information received from the information terminal, wherein the security information includes information on a type and a version of software in a set of software stored in a storage device of the information terminal; and a controller including:
a receiver for receiving security information regarding the information terminal from the RFID tag, before accessing the network;
a storage device for storing access permission criteria, the access permission criteria including a required type and a required version of the software in the set of software, before accessing the network, and
a processor for determining whether to permit access of the information terminal to the network based on the security information received by the receiver from the storage device of the RFID tag and the access permission criteria stored in the storage device of the controller, and for generating a control signal for permitting the access of the information terminal to the network only when the type and the version of each software in the set of software on the information terminal matches the required type and the required version of each software in the set of software included in the access permission criteria stored in the storage device of the controller.

6. The management system according to claim 5, wherein the receiver includes an RFID reader, and the controller receives, through the RFID reader, the security information stored in the RFID tag included in the information terminal.

7. The management system according to claim 5, wherein when the software in the set of software stored in the storage device of the information terminal is not of a predetermined version or higher, the controller generates a control signal for blocking access of the information terminal to the network.

8. The management system according to claim 7, wherein the predetermined version is a latest version, and wherein the controller receives and stores information regarding the latest version in the storage device of the controller.

9. The management system according to claim 5, wherein the controller further includes a firewall of the network, and the controller generates a filter signal for the firewall as the control signal.

10. A method to monitor access of an information terminal to a network within a secured site, the method comprising:
receiving at an RFID tag security information regarding the information terminal from the information terminal, wherein the security information includes information on a type and a version of software in a set of software stored in a storage device of the information terminal;
receiving at a controller the security information regarding the information terminal from the RFID tag using an RFID reader, the controller including a storage device storing access permission criteria, the access permission criteria including a required type and a required version of the software in the set of software; and
determining at the controller whether to permit access of the information terminal to the network based on the received security information and the access permission criteria stored in the storage device of the controller, and generating a control signal for permitting access of the information terminal to the network only when the type and the version of each software in the set of software on the information terminal matches the required type and the required version of each software in the set of software included in the access permission criteria stored in the storage device of the controller.

11. The method of claim 10, wherein the controller further includes a firewall of the network, the controller generating a filter signal for the firewall as the control signal.

12. The method of claim 11, wherein the controller receives information on a latest version of the software and stores the information on the latest version in the storage device of the controller.

* * * * *